US005079136A

United States Patent [19]

Tachibana et al.

[11] Patent Number: 5,079,136

[45] Date of Patent: Jan. 7, 1992

[54] PLASTIC FILM WITH ANTISTATIC LAYER AND SILVER HALIDE PHOTOGRAPHIC LIGHT-SENSITIVE MATERIAL USING THE SAME

[75] Inventors: Noriki Tachibana; Yoichi Saito; Toshiaki Yamazaki, all of Hino, Japan

[73] Assignee: Konica Corporation, Tokyo, Japan

[21] Appl. No.: 495,433

[22] Filed: Mar. 16, 1990

[30] Foreign Application Priority Data

Apr. 7, 1989 [JP] Japan .................................... 1-89303

[51] Int. Cl.$^5$ .......................... G03C 1/82; B32B 9/04; B32B 27/08

[52] U.S. Cl. ................................. 430/529; 428/411.1; 428/483; 428/520; 430/527; 430/531; 430/534; 430/536

[58] Field of Search ............... 430/527, 529, 531, 534, 430/536; 428/411.1, 483, 520

[56] References Cited

U.S. PATENT DOCUMENTS

| | | | |
|---|---|---|---|
| 4,147,550 | 4/1979 | Campbell et al. | 430/529 |
| 4,161,407 | 7/1979 | Campbell | 96/114 |
| 4,225,665 | 9/1980 | Schadt, III | 430/529 |
| 4,363,871 | 12/1982 | Shibue et al. | 430/529 |
| 4,388,402 | 6/1983 | Mukunoki et al. | 430/529 |
| 4,396,708 | 8/1983 | Ogawa | 430/529 |
| 4,407,939 | 10/1983 | Naoi et al. | 430/536 |
| 4,495,275 | 1/1985 | Yokoyama et al. | 430/527 |
| 4,668,748 | 5/1987 | Hardam et al. | 526/240 |
| 4,822,727 | 4/1989 | Ishigaki et al. | 430/531 |
| 4,891,306 | 1/1990 | Yokoyama et al. | 430/529 |
| 4,895,791 | 1/1990 | Mukunoki | 430/529 |
| 4,908,277 | 3/1990 | Tsunashima et al. | 428/483 |

FOREIGN PATENT DOCUMENTS

| | | | |
|---|---|---|---|
| 18601 | 11/1980 | European Pat. Off. . | |
| 251531 | 1/1988 | European Pat. Off. . | |
| 307856 | 3/1989 | European Pat. Off. . | |
| 3124984 | 2/1982 | Fed. Rep. of Germany | 430/529 |
| 2488700 | 2/1982 | France | 430/527 |
| 63-14141 | 1/1988 | Japan | 430/536 |

*Primary Examiner*—Richard L. Schilling
*Attorney, Agent, or Firm*—Jordan B. Bierman

[57] ABSTRACT

A plastic film with an antistatic layer and a silver halide photographic light-sensitive material using the film as the support are disclosed. The antistatic layer comprises a water-soluble electric conductive polymer and particles of a hydrophobic polymer, and hardened with a hardening agent. The hydrophobic polymer has an N-methylol or its derivative group, an amino group, an epoxy group, an aziridine group, an active methylene group, a sulfinic acid group, an aldehyde group, a vinylsulfonyl group or a blocked isocyanate group. A silver halide photographic material using the film having the inventive antistatic layer is excellent in layer adhesion and sufficiently protected from static charge even after processing.

25 Claims, No Drawings

PLASTIC FILM WITH ANTISTATIC LAYER AND SILVER HALIDE PHOTOGRAPHIC LIGHT-SENSITIVE MATERIAL USING THE SAME

FIELD OF THE INVENTION

This invention relates to an antistatic layer for plastic film use and, more particularly, to a silver halide photographic light-sensitive material excellent in antistatic characteristics.

BACKGROUND OF THE INVENTION

Generally, the electrification properties of plastic films are so strong that there are many instances where many restrictions are imposed on their application. In silver halide photographic light-sensitive materials, for example, a polyethylene terephthalate support is generally used.

However, such a support is liable to be electrified, especially, in the relatively low humidity conditions. When a high-speed photographic emulsion is coated at a high-speed, or when a high-speed light-sensitive material is exposed to light through an automatic printer and is then processed as in recent years, a measure to counter electrification is particularly essential.

If a light-sensitive material is electrified or statically charged, the discharge may produce a static-mark or may make a foreign matter such as dusts adhere to the light-sensitive material, thereby producing pin-holes or the like, so that the quality of the light-sensitive material may seriously be worsened. When remedying of the above-mentioned troubles, the working efficiency will seriously be lowered. Therefore, an anti- static agent is generally used in light-sensitive materials and, in recent years, a fluorine containing-surfactant, a cationic surfactant, an amphoteric surfactant, a surfactant or high molecular compound containing a polyethylene oxide group, or a polymer having an intramolecular sulfonic acid group or a phosphoric acid group is used.

In particular, it has been getting popular to use a triboelectric series control method in which a fluorine type surfactant is used, and a conductivity improvement method in which an electric conductive polymer is used. For example, Japanese Patent Publication Open to Public Inspection (hereinafter referred to as Japanese Patent O.P.I. Publication) Nos. 49-91165/1974 and 49-121523/1974 disclose each the examples of applying an ionizing-type polymer having an ionic dissociation group on a polymer principal chain.

In the above-mentioned conventional techniques, however, an antistatic ability is sharply dropped after a development process. It may be presumed that the antistatic ability may be lost by carrying out an alkaline developing step, an acidic fixing step, a washing step, and so forth. Therefore, in an instance where a processed film is further used to make a print, such as in the instance of using a graphic arts light-sensitive material, there may arise such a trouble as pin-holes produced by the adhesion of dusts. To try to solve the above-mentioned trouble, Japanese Patent O.P.I. Publication Nos. 55-84658/1980 and 61-174542/1986, for example, made the proposals each for the antistatic layers comprising a water-soluble conductive polymer containing a carboxyl group, a hydrophobic polymer containing a carboxyl group and a multifunctional aziridine. According to the proposed methods, the antistatic ability can be maintained even after completing the whole process, however, such antistatic layer have been defective in adhesion property to a hydrophilic colloidal layer coated thereon, thereby producing peeling-off troubles in the course of a development process.

SUMMARY OF THE INVENTION

As the measure to counter the above-mentioned problems, it is an object of the invention to provide an antistatic layer for plastic film use, which does not produce the deterioration in antistatic ability even after a development process and is excellent in adhesion property.

Another object of the invention is to provide a silver halide photographic light-sensitive material excellent in antistatic property.

The above-mentioned objects of the invention can be achieved with a plastic film having thereon an antistatic layer comprising a water-soluble electric conductive polymer and particles of a hydrophobic polymer, and hardened with a hardening agent, wherein said hydrophobic polymer has an N-methylol or its derivative group, an amino group, an epoxy group, and aziridine group, an active methylene group, a sulfinic acid group, an aldehyde group, a vinylsulfonyl group or a blocked isocyanate group, and a silver halide photographic light-sensitive material using the plastic film as the support thereof.

DETAILED DESCRIPTION OF THE INVENTION

The water-soluble conductive polymers of the invention include, for example, a polymer having at least one conductive group selected from the group consisting of a $—SO_3M$ group, a $—OSO_3M$ group, in which M is a hydrogen atom or a cation, a quaternary ammonium salt group, a tertiary ammonium salt group, a carboxyl group, and a polyethylene oxide group. Among these groups, a $—SO_3M$ group, a $—OSO_3M$ group, and a quaternary ammonium salt group are preferable. The above-mentioned at least one conductive group is required to be not less than 5% by weight of the polymer. The water-soluble conductive polymer is preferable to contain an N-methylol group and the derivatives thereof, a hydroxy group, an amino group, an epoxy group, an aziridine group, an active methylene group, a sulfinic acid group, an aldehyde group, a vinylsulfone group, or a blocked isocyanate group. Each of these groups is preferably required to be not less than 5% by weight of the polymer. The molecular weight of each polymer is 3000 to 100000 and, preferably, 3500 to 50000.

The examples of the water-soluble conductive polymer compounds applicable to the invention will be given below. It is, however, to be understood that the invention shall not be limited thereto.

Homopolymer (1)

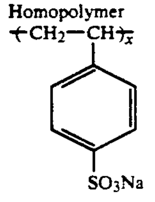

$\overline{M} \approx 20000$

-continued
(2)
Homopolymer
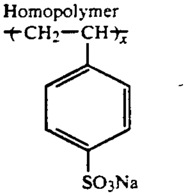
$\bar{M} \approx 5000$
(3)
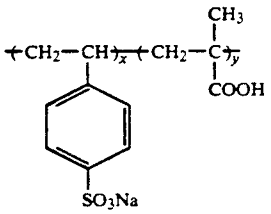
x:y = 98.5:1.5
$\bar{M} \approx 5000$
(4)
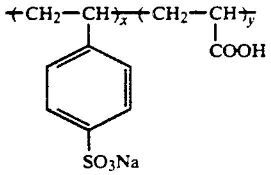
x:y = 50:50
$\bar{M} \approx 12000$
(5)
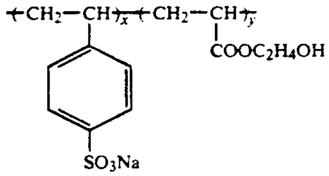
x:y = 70:30
$\bar{M} \approx 5000$
(6)
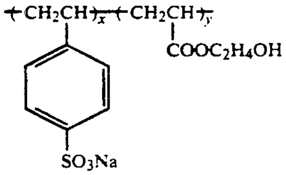
x:y = 90:10
Mn ≈ 10000
(7)
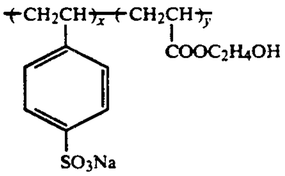
x:y = 60:40
Mn ≈ 7000
(8)
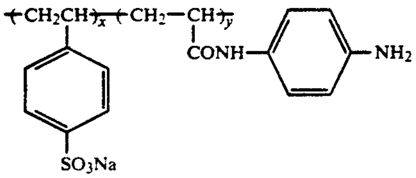
x:y = 90:10
Mn = 15000
-continued
(9)
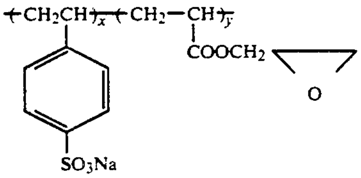
x:y = 60:40
Mn = 5000
(10)
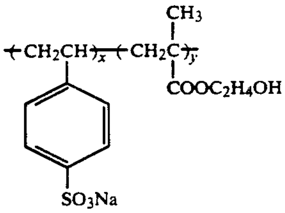
x:y = 90:10
Mn = 20000
(11)
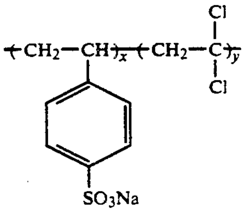
x:y = 97:3
$\bar{M} \approx 30000$
(12)
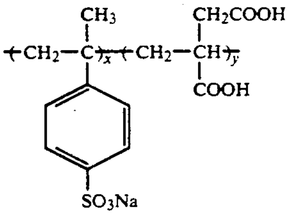
x:y = 98:2
$\bar{M} \approx 5000$
(13)
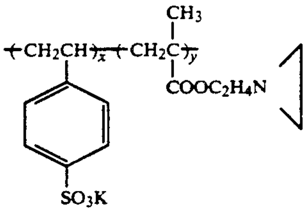
x:y = 60:40
Mn = 8000
(14)
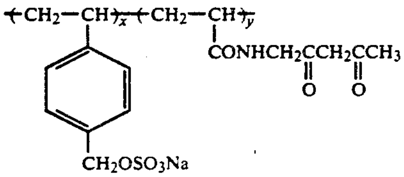
x:y = 95:5
$\bar{M} \approx 25000$ -continued
(15)
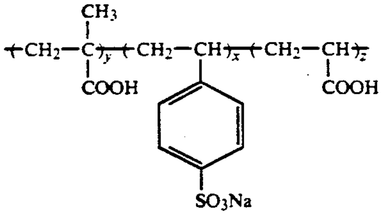
x:y:z = 80:19:1
$\bar{M} \approx 5000$
(16)
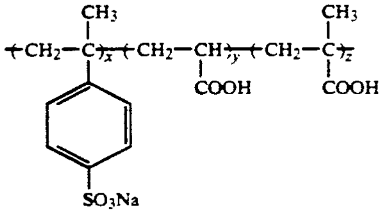
x:y:z = 70:80:2
$\bar{M} \approx 6000$
(17)
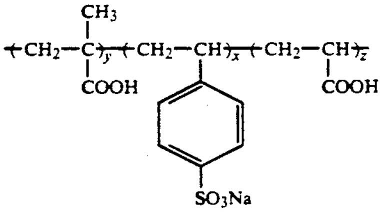
x:y:z = 85:13:2
$\bar{M} \approx 8000$
(18)
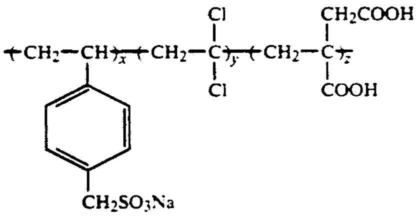
x:y:z = 80:16:4
$\bar{M} \approx 10000$
(19)
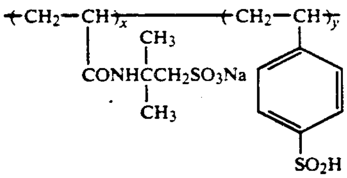
x:y = 90:10
$\bar{M} \approx 30000$
(20)
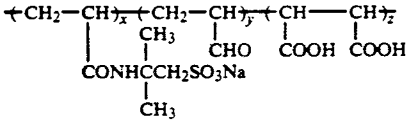
x:y:z = 85:10:5
$\bar{M} \approx 10000$
(21)
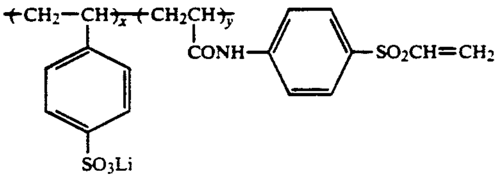
x:y = 90:10
$\bar{M} \approx 6000$
-continued
(22)
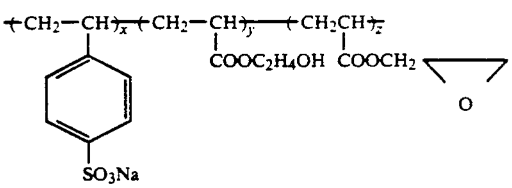
x:y:z = 80:10:10
$\bar{M} \approx 15000$
Dextran sulfate (23)
Substitution degree: 2.0 M = 100000
(24)
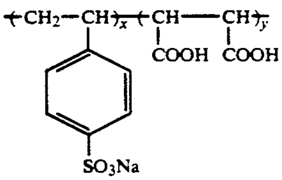
x:y = 66:34
$\bar{M} \approx 5000$
(25)
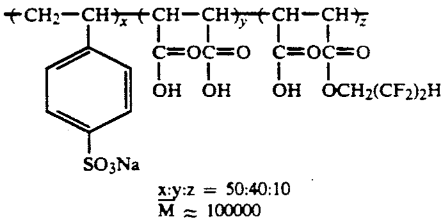
x:y:z = 50:40:10
$\bar{M} \approx 100000$
(26)
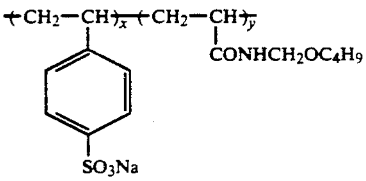
x:y = 80:20
$\bar{M} \approx 50000$
(27)
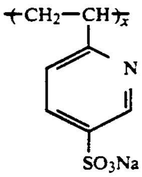
$\bar{M} \approx 100000$
(28)
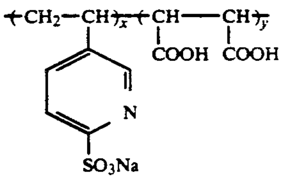
x:y = 70:30
$\bar{M} \approx 5000$
(29)
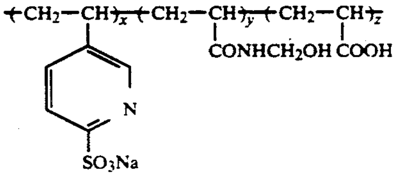
x:y:z = 55:35:10
$\bar{M} \approx 30000$ -continued

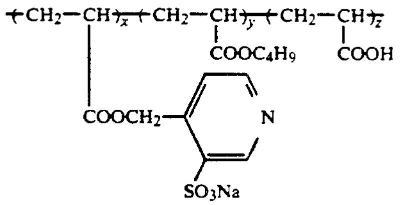 (30)

x:y:z = 50:10:40
$\overline{M} \approx 60000$

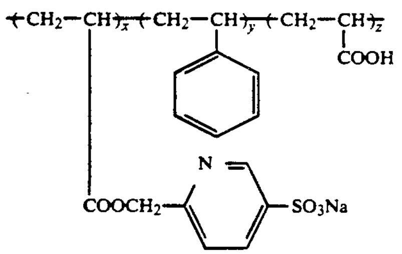 (31)

x:y:z = 60:10:30
$\overline{M} \approx 60000$

In Examples (1) through (31) given above, x, y, w represent each a mol % of a monomer component, and $\overline{M}$ represents an average molecular weight which means a number average molecular weight in this specification.

The above-given polymers can be synthesized by polymerizing any monomers available on the market or prepared in an ordinary method.

The hydrophobic polymer particles to be contained in the water-soluble conductive polymer layer of the invention, are substantially insoluble to water and contained therein in the form of the so-called latexes. Such hydrophobic polymers are required to contain at least one group selected from the group consisting of an N-methylol group and the derivative thereof, an amino group, an epoxy group, an aziridine group, an active methylene group, a sulfinic acid group, an aldehyde group, a vinylsulfone group, and a blocked isocyanate group. The groups given above are contained in a proportion of preferably not less than 1% by weight of the hydrophobic polymers and more preferably not less than 5%. These hydrophobic polymers can be prepared by polymerizing the polymers selected from any combination consisting of a styrene and the derivative thereof, an alkyl acrylate, an alkyl methacrylate, an olefin derivative, a halogenoethylene derivative, an acrylamide derivative, a methacrylamide derivative, a vinyl ester derivative, and an acrylonitrile. Among these hydrophobic polymers, ones containing a styrene derivative, an alkyl acrylate or an alkyl methacrylate in a proportion of not less than 30 mol % and, particularly, not less than 50 mol % are preferable.

There are two methods for making the hydrophobic polymers be in the latex form, one is to emulsion-polymerizing them, and another is to dissolve solid polymers in a low boiling solvent so as to be finely dispersed them in an aqueous medium and the solvent is then distilled off. The emulsion-polymerization method is preferable, because the resulting particles are small and uniform in size.

As a surfactant applied to the emulsion-polymerization, the anionic or nonionic surfactants are preferably used, and such surfactants are used preferably in a proportion of not more than 10% by weight to the monomers used. An excessive amount of the surfactant will cause a conductive layer being clouded.

It is good enough when the hydrophobic polymers have a molecular weight of not less than 3000. There is almost no difference in transparency of the conductive layer, even if the molecular weight is varied.

The concrete examples of the hydrophobic polymers of the invention will be given below.

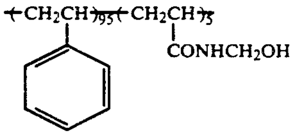 1.

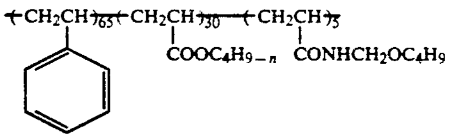 2.

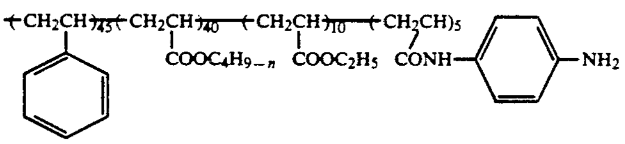 3.

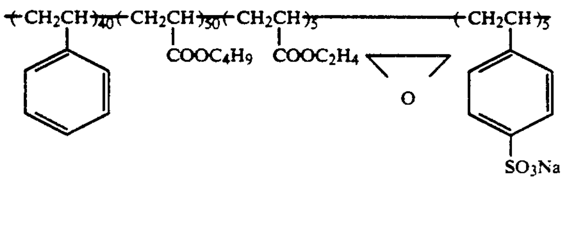 4.

-continued
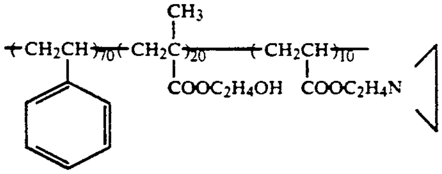
5.
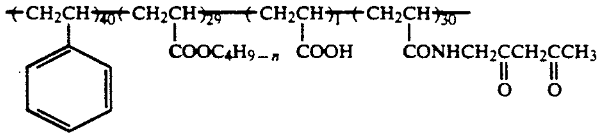
6.
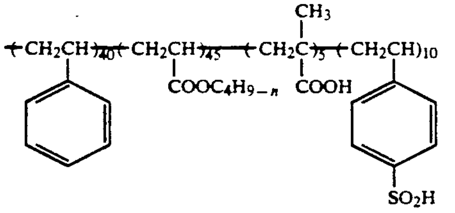
7.
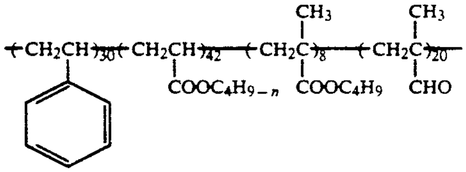
8.
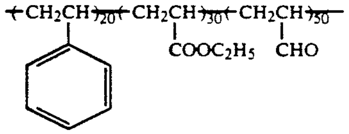
9.
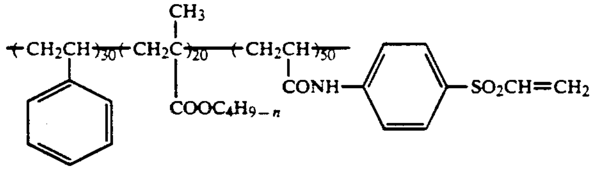
10.
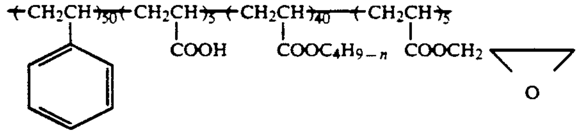
11.
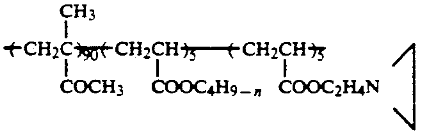
12.
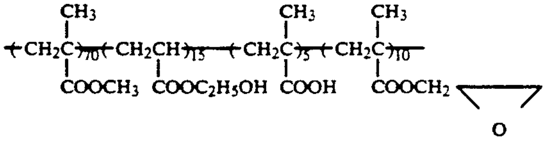
13.
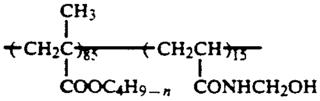
14.

-continued

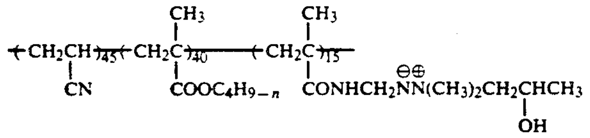

15.

In the invention, a conductive layer is coated over a transparent support. The supports applicable thereto include any kinds of supports for photographic use. Among them, the preferable ones are those made of polyethylene terephthalate or cellulose triacetate, which are so prepared as to transmit not less than 90% of visible rays of light.

These transparent supports are prepared in the methods having been well-known in the art. If occasion requires, the supports are allowed to be bluish by adding a small amount of dyes so as not to substantially inhibit light from transmitting through the supports.

After the support is subject to a corona-discharge treatment, it is allowed to coat thereon a subbing layer containing a latex polymer. When treating the corona-discharge, it is more preferable to apply an energy value of 1 mW to 1 $KW/m^2 \cdot min$. In particular, it is preferable to carry out another corona-discharge treatment again between a point of time after coating a latex-subbing layer and a point of time before coating a conductive layer.

The agents for hardening the conductive layers of the invention include, preferably, a multifunctional aziridine compound and, more preferably, a bifunctional or trifunctional one having a molecular weight of not more than 600.

The conductive layers of the invention may be arranged either to the support side closer than a light-sensitive layers or to the opposite side of the support, that is, the back side thereof, with respect to the light-sensitive layers.

This invention can be applied to any light-sensitive material formed on a support, including, for example, a silver halide color light-sensitive material, a radiographic material, and a graphic arts light-sensitive material.

In the silver halide emulsions applicable to the light-sensitive materials of the invention, any silver halides applicable to ordinary silver halide emulsions may be used, such as silver bromide, silver chloride, silver iodobromide, silver chlorobromide, and silver chloroiodobromide. Any silver halide grains may be used in the invention, provided, they are prepared in an acidic method, a neutral method, or an ammoniacal method.

Such silver halide grains may be either those having a uniform silver halide composition distribution therein or core/shell type grains having the different silver halide composition between the inside of the grains and the surface layer thereof. They are further allowed to be either those capable of forming a latent image mainly on the surface thereof or those capable of forming a latent image mainly inside thereof.

The silver halide emulsions applicable to the invention can be stabilized with the use of such a compound as described in, for example, U.S. Pat. Nos. 2,444,607, 2,716,062, and 3,512,982, West German DAS Patent Nos. 1,189,380, 2,058,626, and 2,118,411, Japanese Patent Examined Publication No. 43-4133/1968, U.S. Pat. No. 3,342,596, Japanese Patent Examined Publication No. 47-4417/1972, West German DAS Patent No. 2,149,789, and Japanese Patent Examined Publication Nos. 39-2825/1964 and 49-13566/1974. These compounds for stabilization preferably include, for example, 5,6-trimethylene-7-hydroxy-S-triazolo(1,5-a)pyrimidine, 5,6-tetramethylene-7-hydroxy-S-triazolo(1,5-a)pyrimidine, 5-methyl-7-hydroxy-S-triazolo(1,5-a)pyrimidine, 5-methyl-7-hydroxy-S-triazolo(1,5-a)pyrimidine, 7-hydroxy-S-triazolo-(1,5-a)pyrimidine, 5-methyl-6-bromo-7-hydroxy-S-triazolo-(1,5-a)pyrimidine, gallic acid esters and salts such as isoamyl gallate, dodecyl gallate, propyl gallate, and sodium gallate, mercaptans such as 1-phenyl-5-mercaptotetrazole, and 2-mercaptobenzthiazole, benzotriazoles such as 5-bromobenztriazole, and 5-methylbenztriazole, and benzimidazoles such as 6-nitrobenzimidazole.

The silver halide photographic light-sensitive materials and/or the developers, each relating to the invention, may contain an amino compound.

For the purpose of enhancing a developability of light-sensitive material, a developing agent such as phenidone and hydroquinone, and an inhibitor such as benztriazole may be contained in the emulsion side. Or, for the purpose of improving the processability of a processing solution, such a developing agent or inhibitor may be contained in a backing layer.

The hydrophilic colloids particularly advantageous to the invention include, for example, gelatin.

Either alkali-processed and acid-processed gelatins are applicable. When using ossein gelatin, it is preferable to remove calcium or iron contents. The calcium contents are preferably 1 to 999 ppm and, more preferably, 1 to 500 ppm. The iron contents are preferably 0.01 to 50 ppm and, more preferably, 0.1 to 10 ppm. Such calcium and iron contents may be adjusted by passing an aqueous gelatin solution through an ion-exchanging apparatus.

When developing the silver halide photographic light-sensitive materials relating to the invention, the developing agents applicable thereto include, for example, catechol, pyrogallol and the derivatives thereof, ascorbic acid, chlorohydroquinone, bromohydroquinone, methylehydroquinone, 2,3-dibromohydroquinone, 2,5-diethylhydroquinone, 4-chlorocatechol, 4-phenylcatechol, 3-methoxycatechol, 4-acetylpyrogallol, and sodium ascorbate.

The $HO-(CH{=}CH)_n-NH_2$ type developing agents include an ortho- or para-aminophenol as a typical example and, besides, 4-aminophenol, 2-amino-6-phenylphenol, 2-amino-4-chloro-6-phenylphenol, and N-methyl-p-aminophenyl.

The $H_2N-(CH{=}CH)_n-NH_2$ type developing agents include, for example, 4-amino-2-methyl-N,N-diethylaniline, 2,4- diamino-N,N-diethylaniline, N-(4-amino-3-methylphenyl)-morpholine, and p-phenylenediamine.

The heterocyclic type developing agents include, for example, 3-pyrazolidones such as 1-phenyl-3-pyrazolidone, 1-phenyl-4,4-dimethyl-3-pyrazolidone, and 1-phenyl-4-methyl- 4-hydroxymethyl-3-pyrazolidone, 1-phenyl-4-amino-5-pyrazolone, and 5-aminouracil.

The developing agents effectively applicable to the invention include those described in, for example, T. H. James, 'The Theory of Photographic Process', 4th Ed., pp. 291-334, and 'Journal of the American Chemical Society', Vol. 73, p. 3,100, 1951. These developing agents may be used independently or in combination. It is, however, preferable to use them in combination. The effects of the invention are not damaged even when using preservatives including, for example, sulfites such as sodium sulfite and potassium sulfite are used in the developers applicable to develop the light-sensitive materials relating to the invention. Such applicable preservatives include, for example, hydroxylamine and hydrazide compounds. In this case, such a preservative is used in an amount of, preferably, 5 to 500 g and, more preferably, 20 to 200 g per liter of the developer used.

Into such a developer as mentioned above, a glycol may be contained to serve as an organic solvent. The glycols preferably applicable thereto include, for example, ethylene glycol, diethylene glycol, propylene glycol, triethylene glycol, 1,4-butanediol, and 1,5-pentanediol. Among these glycols, diethylen glycol is preferable. Such a glycols may be used in an amount of, preferably, 5 to 500 g and, more preferably, 20 to 200 g per liter of the developer used. The organic solvents may be used independently or in combination.

The silver halide photographic light-sensitive materials relating to the invention are able to display a remarkably excellent preservation stability, when they are processed with a developer as mentioned above.

The pH values of the developers having the above-mentioned compositions are, preferably, 9 to 13 and, more preferably, within the range of 10 to 12 from the viewpoints of the preservability and photographic characteristics of the developers. About the cations contained in a developer, it is preferable when a potassium ion content is more than a sodium ion content, because the developer activity may be enhanced.

The silver halide photographic light-sensitive materials relating to the invention can be processed in various conditions. About the processing temperatures, the developing temperature, for example, is preferably not higher than 50° C. and more preferably about 25° C. to 40° C. About the developing time, it is general to complete a development within two minutes and more preferably within the range of 10 to 50 seconds to often expect a good result. It is discretionary to adopt other processing steps than the developing step, such as a washing, stopping, stabilizing, fixing and, if required, a prehardening, and neutralizing steps. These discretionary processing steps may be appropriately omitted. Further, these processing steps may be carried out in the so-called manual processing such as a tray or frame processing and the so-called mechanical processing such as a roller or hanger processing, either.

EXAMPLES

Example-1

A subbed polyethylene terephthalate film was subjected to a corona-discharge treatment and was then coated thereon with an antistatic solution having the following composition in an amount of 10 ml/dm$^2$, at a coating speed of 33 m/min. by means of a roll-fit-coating pan and an air-knife.

| | |
|---|---|
| Water-soluble conductive polymer shown as A in Table 1 | 6 g/l |

-continued

| | |
|---|---|
| Latex of the invention shown as B in Table 1 | 4 g/l |
| Hardener H | |
| 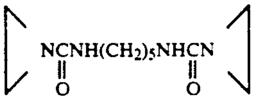 | 1.5 g/l |

The resulting antistatic layer-coated film support was dried at 90° C. for 2 minutes and was then heat-treated at 140° C. for 90 seconds. Over the antistatic layer, gelatin was coated in an amount of 2.0 g/m$^2$, and an adhesion tests was tried. As the hardener for hardening gelatin, formalin and sodium 2,4-dichloro-6- hydroxy-S-triazine were used. The results thereof are shown in Table-1.

1. Adhesion tests

Dried emulsion-adhesion test

A slight razor-cut was given checkerwise over the gelatin layer surface of the sample and a cellophane adhesive tape was brought into pressure contact thereon. When the tape was peeled off by force, the gelatin layer remained on the support was checked up. The ratio of the gelatin layer-remaining area to the whole tape-adhered area is shown in terms of percentage in Table-1.

Wet adhesion test with developer

In the developing bath mentioned later, the gelatin of the sample was picked checkerwise with drill-like sharp point. When the gelatin surface was rubbed, the gelatin layer remained on the support was checked up. The ratio of the gelatin remaining area to the whole picked area is shown in terms of percentage in Table-1. There is no difficulty when the percentage thereof is not less than 80%.

TABLE 1

| | (A) | (B) | Dried adhesion (%) | Wet adhesion (%) |
|---|---|---|---|---|
| Inventive | (6) | (1) | 95 | 95 |
| Inventive | (8) | (2) | 95 | 95 |
| Inventive | (9) | (4) | 95 | 90 |
| Inventive | (10) | (13) | 90 | 90 |
| Inventive | (13) | (15) | 95 | 95 |
| Inventive | (24) | (13) | 90 | 90 |
| Comparative | (24) | (a) | 80 | 70 |

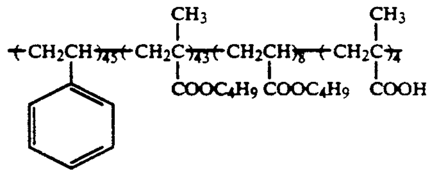

Example-2

<Support with antistatic layer>

A corona-discharge having a power of 30 W/m$^2$ was applied to a 100 μm thick polyethylene terephthalate support. The support was coated on a side with a subbing solution containing a latex of butyl acrylate-styrene-t-butyl acrylate-hydroxyethyl methacrylate copolymer and a hexamethylene aziridine hardener, and the antistatic layer of the invention was further coated thereon in the same manner as in Example-1.

The other side of the support on which a silver halide emulsion layer to be provided, was coated with a subbing solution containing a latex of vinylidene chloride-itaconic acid copolymer.

<Backing layer>

Next, onto the antistatic layer, a backing layer containing the backing dye having the following composition was coated. The gelatin layer was hardened with glyoxal and sodium 1-oxy-3,5-dichloro-S-triazine salt.

| Composition of the backing layer | |
|---|---|
| Hydroquinone | 100 mg/m$^2$ |
| Phenidone | 30 mg/m$^2$ |
| Latex polymer: Butyl acrylate-styrene-acrylic acid copolymer | 0.5 g/m$^2$ |
| Stryene-maleic acid copolymer | 100 mg/m$^2$ |
| Citric acid | 40 mg/m$^2$ |
| Benzotriazole | 100 mg/m$^2$ |
| Sodium styrenesulfonate-maleic acid copolymer | 200 mg/m$^2$ |
| Lithium nitrate | 30 mg/m$^2$ |
| Backing dyes a, b, c* | |
| Ossein gelatin | 2.0 g/m$^2$ |

*Backing dye a 40 mg/m$^2$

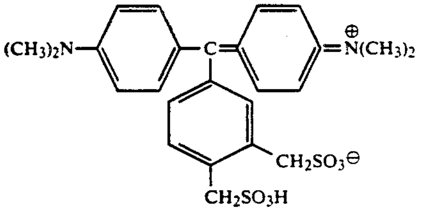

*Backing dye b 30 mg/m$^2$

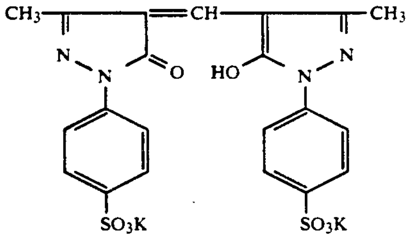

*Backing dye c 30 mg/m$^2$

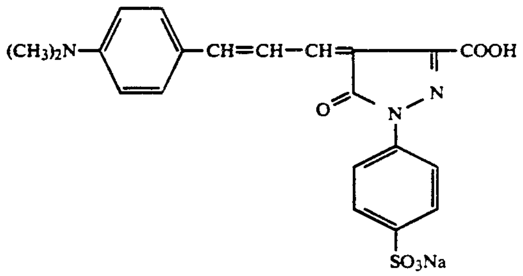

<Silver halide emulsion>

A silver chloride emulsion containing rhodium of $10^{-5}$ mols per mol of silver was prepared in a controlled double-jet method under an acidic atmosphere of pH 3.0. Silver chloride grains of the emulsion were grown in the system containing benzyladenine in an amount of 30 mg per liter of an aqueous 1% gelatin solution. After silver salt solution and halide solution were mixed up, 6-methyl-4-hydroxy-1,3,3a,7-tetrazaindene was added in an amount of 600 mg per mol of the silver halide used, and then washed and desalted.

Next, after adding 6-methyl-4-hydroxy-1,3,3a,7-tetrazaindene in an amount of 60 mg per mol of the silver halide, a sulfur-sensitization was applied. After the sulfur-sensitization, 6-methyl-4-hydroxy-1,3,3a,7-tetrazaindene was added as a stabilizer.

<Silver halide emulsion layer>

The additives were added into each resulting emulsion so as to adjust the contents of the additives to be in the quantities given below. The emulsion was coated on each of the above-mentioned supports. The emulsion was coated on the side of the support opposite to the side on which the backing layer was provided.

| | |
|---|---|
| Latex of styrenebutyl acrylate-acrylic acid copolymer | 1.0 g/m$^2$ |
| Tetraphenylphosphonium chloride | 30 mg/m$^2$ |

-continued

| | |
|---|---|
| Saponin | 200 mg/$m^2$ |
| Polyethylene glycol | 100 mg/$m^2$ |
| Sodium dodecylbenzenesulfonate | 100 mg/$m^2$ |
| Hydroquinone | 200 mg/$m^2$ |
| Phenidone | 100 mg/$m^2$ |
| Sodium styrenesulfonate-maleic acid copolymer (Mw = 250,000) | 200 mg/$m^2$ |
| Butyl gallate | 500 mg/$m^2$ |
| 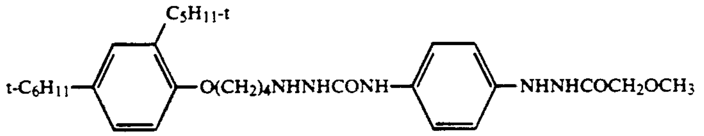 | 30 mg/$m^2$ |
| 5-methylbenzotriazole | 30 mg/$m^2$ |
| 2-mercaptobenzimidazole-5-sulfonic acid | 30 mg/$m^2$ |
| Inert ossein gelatin (with an isoelectric point of 4.9) | 1.5 g/$m^2$ |
| 1-(p-acetylamidophenyl)-5-mercaptotetrazole | 30 mg/$m^2$ |
| Silver | 2.8 g/$m^2$ |

<Protective layer for emulsion layer>

A protective layer for emulsion layer was coated so as to adjust the content to be in the quantity given below.

| | |
|---|---|
| Fluorinated dioctyl sulfosuccinate | 300 mg/$m^2$ |
| Matting agent: Methyl polymethacrylate (having an average particle-size of 3.5 μm) | 100 mg/$m^2$ |
| Lithium nitrate | 30 mg/$m^2$ |
| Acid-processed gelatin (with an isoelectric point of 7.0) | 1.2 g/$m^2$ |
| Colloidal silica | 50 mg/$m^2$ |
| Sodium styrenesulfonate-maleic acid copolymer | 100 mg/$m^2$ |
| Mordant | |
| 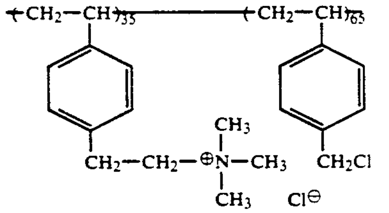 | |
| Dye | |
| 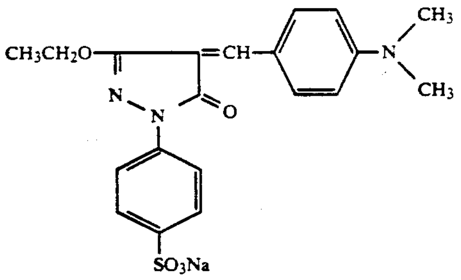 | |

The resulting sample was overall-exposed to light and processed with the following developer and fixer. After then, dry and wet layer-adhesion tests were tried. Further the specific surface resistance was measured on the backing side of the processed sample.

| | |
|---|---|
| Composition of developer | |
| Hydroquinone | 25 g |
| 1-phenyl-4,4-dimethyl-3-pyrazolidone | 0.4 g |

-continued

| | |
|---|---|
| Sodium bromide | 3 g |
| 5-methylbenzotriazole | 0.3 g |
| 5-nitroindazole | 0.05 g |
| Diethylaminopropane-1,2-diol | 10 g |
| Potassium sulfite | 90 g |
| Sodium 5-sulfosalicylate | 75 g |
| Sodium ethylenediaminetetraacetate | 2 g |
| Add water to make | 1 liter |
| Adjust pH with caustic soda to be | 11.5 |
| Composition of fixer | |
| Composition A | |
| Ammonium thiosulfate (in an aqueous 72.5% solution) | 240 ml |
| Sodium sulfite | 17 g |
| Sodium acetate, trihydrate | 6.5 g |
| Boric acid | 6 g |
| Sodium citrate, dihydrate | 2 g |
| Acetic acid (in an aqueous 90 w % solution) | 13.6 ml |
| Composition B | |
| Pure water (i.e., ion-exchange water) | 17 ml |
| Sulfuric acid (in an aqueous 50 w % solution) | 3.0 g |
| Aluminium sulfate (in an aqueous solution having a 8.1 w % $Al_2O_3$ equivalent content) | 20 g |

In advance, the above-mentioned Compositions A and B were dissolved in order into 500 ml of water to make one liter, and the fixer was then used. The pH of the fixer was about 5.6.

| | Processing conditions | |
|---|---|---|
| Processing step | Processing temperature | Processing time |
| Developing | 40° C. | 8 seconds |
| Fixing | 35° C. | 8 seconds |
| Washing | Ordinary temp. | 10 seconds |

The adhesion tests were made in the same manner as Example and the results are shown in Table-2 given below.

TABLE 2

| | (A) | (B) | Dried adhesion after processing (%) | Wet adhesion (%) | Specific surface resistance |
|---|---|---|---|---|---|
| Inventive | (6) | (1) | 95 | 95 | $5 \times 10^{10}$ |
| Inventive | (10) | (13) | 95 | 95 | $5 \times 10^{10}$ |
| Inventive | (24) | (13) | 95 | 90 | $8 \times 10^{10}$ |
| Compara- | (24) | (a) | 75 | 70 | $5 \times 10^{10}$ |

TABLE 2-continued

| | (A) | (B) | Dried adhesion after processing (%) | Wet adhesion (%) | Specific surface resistance |
|---|---|---|---|---|---|
| tive | | | | | |

The Specific surface resistance by Ω/cm. These values of the specific surface resistance indicate that the processed samples are sufficiently protected from static charge.

Further, when the hydrazine compound contained in the emulsion layer was replaced by the following tetrazolium salts, the same effects as in this example were displayed.

Tetazolium compound

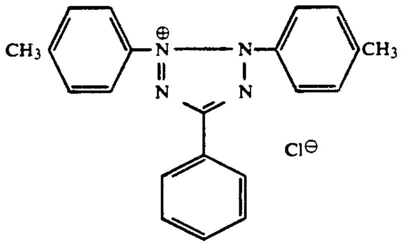

From the results shown in Table-2, it is found that the samples of the invention were very few in the deterioration of antistatic capability even after the samples were developed, and were remarkably improved on the layer adhesion even after they were processed, as compared to the comparative sample.

What is claimed is:

1. A plastic film having thereon an antistatic layer consisting essentially of a water-soluble electrically conductive polymer and particles of a hydrophobic polymer, and hardened with a hardening agent, wherein said hydrophobic polymer has an N-methylol or its derivative group, an amino group, an epoxy group, an aziridine group, an active methylene group, a sulfinic acid group, an aldehyde group, a vinylsulfonyl group or a blocked isocyanate group.

2. The film of claim 1, wherein said hydrophobic polymer has an N-methylol or its derivative group, an amino group, an epoxy group, an aziridine group, an active methylene group, a sulfinic acid group, an aldehyde group, a vinylsulfonyl group or a blocked isocyanate group in an amount of not less than 1% by weight of said hydrophobic polymer.

3. The film of claim 2, wherein said hydrophobic polymer has an N-methylol or its derivative group, an amino group, an epoxy group, an aziridine group, an active methylene group, sulfinic acid group, an aldehyde group, a vinylsulfonyl group or a blocked isocyanate group in an amount of not less than 5% by weight of said hydrophobic polymer.

4. The film of claim 1, wherein said hydrophobic polymer has a molecular weight of not less than 3000.

5. The film of claim 1, wherein said water-soluble polymer is a polymer having a $—SO_3M$ group, a $—OSO_3M$ group, in which M is a hydrogen atom or a cation, a quaternary ammonium salt group, a tertiary ammonium salt group, a carboxyl group or a polyethylene oxide group.

6. The film of claim 5, wherein said water-soluble polymer has a $—SO_3M$ group, $—OS_3M$ group, in which M is a hydrogen atom or a cation, or a quaternary ammonium salt group.

7. The film of claim 5, wherein said water-soluble polymer has a $—SO_3M$ group, $—OSO_3M$ group, in which M is a hydrogen atom or a cation, a quaternary ammonium salt group, a tertiary ammonium salt group, a carboxyl group or a polyethylene oxide group in an amount of not less than 5% by weight of said water-soluble polymer.

8. The film of claim 5, wherein said water-soluble polymer further has an N-methylol or its derivative group, an amino group, an epoxy group, an aziridine group, an active methylene group, sulfinic acid group, an aldehyde group, a vinylsulfonyl group or a blocked isocyanate group.

9. The film of claim 8, wherein said water-soluble polymer has an N-methylol group or its derivative groups, an amino group, an epoxy group, an aziridine group, an active methylene group, a sulfinic acid group, an aldehyde group a vinylsulfonyl group or a blocked isocyanate group in an amount of not less than 5% by weight of said water-soluble polymer.

10. The film of claim 1, wherein said water-soluble polymer has a molecular weight of from 3000 to 100000.

11. The film of claim 10, wherein said water-soluble polymer has a molecular weight of from 3500 to 50000.

12. The film of claim 1, said hardening agent is a multi-functional aziridine compound.

13. A silver halide photographic light-sensitive material comprising a silver halide emulsion layer and a plastic film, having thereon an antistatic layer consisting essentially of a water-soluble electrically conductive polymer and particles of a hydrophobic polymer, and hardened with a hardening agent, wherein said hydrophobic polymer has an N-methylol or its derivative group, an amino group, an epoxy group, an aziridine group, an active methylene group, a sulfinic acid group, an aldehyde group, a vinylsulfonyl group or a blocked isocyanate group.

14. The material of claim 13, wherein said hydrophobic polymer has an N-methylol or its derivative group, an amino group, an epoxy group, an aziridine group, an active methylene group, sulfinic acid group, an aldehyde group, a vinylsulfonyl group or a blocked isocyanate group in an amount of not less than 1% by weight of said hydrophobic polymer.

15. The material of claim 14, wherein said hydrophobic polymer has an N-methylol or its derivative group, an amino group, an epoxy group, an aziridine group, an active methylene group, sulfinic acid group, an aldehyde group, a vinylsulfonyl group or a blocked isocyanate group in an amount of not less than 5% by weight of said hydrophobic polymer.

16. The material of claim 13, wherein said hydrophobic polymer has a molecular weight of not less than 3000.

17. The material of claim 13, wherein said water-soluble polymer is a polymer having a $—SO_3M$ group, a $—OSO_3M$ group, in which M is a hydrogen atom or a cation, a quaternary ammonium salt group, a tertiary ammonium salt group, a carboxyl group or a polyethylene oxide group.

18. The material of claim 17, wherein said water-soluble polymer has a $—SO_3M$ group, a $—OSO_3M$ group, in which M is a hydrogen atom or a cation, a quaternary ammonium salt group.

19. The material of claim 17, wherein said water-soluble polymer has a —$SO_3M$ group, —$OSO_3M$ group, in which M is a hydrogen atom or a cation, a quaternary ammonium salt group, a tertiary ammonium salt group, a carboxyl group or a polyethylene oxide group in an amount of not less than 5% by weight of said water-soluble polymer.

20. The material of claim 17, wherein said water-soluble polymer further has an N-methylol or its derivative group, an amino group, an epoxy group, an aziridine group, an active methylene group, sulfinic acid group, an aldehyde group, a vinylsulfonyl group or a blocked isocyanate group.

21. The material of claim 20, wherein said water-soluble polymer has an N-methylol or its derivative group, an amino group, an epoxy group, an aziridine group, an active methylene group, a sulfinic acid group, an aldehyde group, a vinylsulfonyl group or a blocked isocyanate group in an amount of no less than 5% by weight of said water-soluble polymer.

22. The material of claim 13, wherein said water-soluble polymer has a molecular weight of from 3000 to 100000.

23. The material of claim 22, wherein said water-soluble polymer has a molecular weight of from 3500 to 50000.

24. The material of claim 13, wherein said hardening agent is a multi-functional aziridine compound.

25. The material of claim 13, wherein said antistatic layer is provided on the side of said film opposite to the side on which said silver halide emulsion layer is provided.

* * * * *